United States Patent
Bonacini

(10) Patent No.: US 7,591,295 B2
(45) Date of Patent: Sep. 22, 2009

(54) BEAD BREAKING UNIT FOR TIRE CHANGING MACHINES

(75) Inventor: Maurizio Bonacini, Correggio (IT)

(73) Assignee: Giuliano S.p.A., Correggio (IT)

( * ) Notice: Subject to any disclaimer, the term of this patent is extended or adjusted under 35 U.S.C. 154(b) by 91 days.

(21) Appl. No.: 11/826,310

(22) Filed: Jul. 13, 2007

(65) Prior Publication Data

US 2008/0017324 A1    Jan. 24, 2008

(30) Foreign Application Priority Data

Jul. 19, 2006    (IT)    .......................... MO2006A0236

(51) Int. Cl.
 *B60C 25/132*    (2006.01)
 *B60C 25/128*    (2006.01)
(52) U.S. Cl. ...................... 157/1.17; 157/124; 157/128
(58) Field of Classification Search ............. 157/14–21, 157/1.1, 1.28, 1.17, 1.24, 124, 1.26
 See application file for complete search history.

(56) References Cited

U.S. PATENT DOCUMENTS

| | | | | |
|---|---|---|---|---|
| 5,215,138 A | * | 6/1993 | Toriselli et al. ............ | 157/1.17 |
| 5,219,012 A | * | 6/1993 | Corghi ......................... | 157/19 |
| 5,244,029 A | * | 9/1993 | Schoen et al. .............. | 157/1.17 |
| 5,381,843 A | * | 1/1995 | Corghi ....................... | 157/1.28 |
| 6,408,921 B1 | * | 6/2002 | Bonacini .................... | 157/1.24 |
| 7,225,849 B2 | * | 6/2007 | Routt et al. ................... | 157/19 |

FOREIGN PATENT DOCUMENTS

| | | |
|---|---|---|
| BE | 1005417 | 7/1993 |
| EP | 0557618 | 9/1993 |
| EP | 1524134 | 4/2005 |

OTHER PUBLICATIONS

English Abstract of BE 1005417.

* cited by examiner

*Primary Examiner*—Hadi Shakeri
(74) *Attorney, Agent, or Firm*—Dykema Gossett PLLC

(57) ABSTRACT

A bead breaking unit for tire changing machines includes an arm having an adjustable supporting device for the pad against which a tire can be positioned, the adjustable supporting device including a first body mounting the pad, a second body attached to the base of the tire changing machine, and first and second rods extending through lateral slots in the bodies to control horizontal telescopic movement of the first body relative to the second body and the slant of the pad relative to the base.

21 Claims, 3 Drawing Sheets

BEAD BREAKING UNIT FOR TIRE CHANGING MACHINES

BACKGROUND OF THE INVENTION

The present invention refers to a bead breaking unit for tire changing machines.

THE PRIOR ART

Tire changing machines are normally used to fit/remove tires in/off their seat on rims.

As is common knowledge, before a tire can be removed completely from its rim, it is necessary to detach the beads from their bead clipping edges around the rim.

This operation is done by means of a suitable bead breaking unit, normally present on the tire changing machine, which comprises an arm, located on the side of the main support or base, which has a first end hinged to the support according to a substantially vertical axis, and a second end associated to a bead breaking tool, otherwise called small shovel.

An automatic linear actuator is placed in between the above mentioned arm and the base of the machine that allows the arm to rotate on a horizontal plane and, in particular, its oscillating movement between a working position, wherein the bead breaking tool is in proximity of the machine and in contact with the wheel, and a home position, wherein the bead breaking tool is kept away from the main support.

Near the bead breaking tool a stop is positioned on the base used for resting the rim on and to ensure it is correctly placed during bead breaking; this stop has a resting surface at the front, also called pad, made of a suitable material and usually knurled so as to increase the friction coefficient.

However, the known bead breaking units have some drawbacks, in particular, because of the huge variety of modern tires in terms of size and rigidity characteristics, they would require greater adaptability of the machine; as a matter of fact, the variability of these parameters inevitably affects the good outcome of the bead breaking operation, often making it very difficult with the possibility of damaging the wheel or the rim during the procedure.

Alternatively, there are machines where the bead breaking units are equipped with a pad mounted on a telescopic support, the sliding axis of which is positioned horizontally and crosswise with respect to the main support formed by the tire changing machine frame. This telescopic support can be adjusted based on the size of the wheel that requires bead breaking and, in particular, it lets the small shovel exert pressure on the tire at approximately the same angle, regardless of the size of the wheel.

However, this invention is susceptible to additional upgrading.

In particular, in this specific sector the need is felt to overcome this technical problem by using a bead breaking unit with mechanical characteristics that render it suitable for bead breaking different types of tire.

The main aim of this invention is to provide a bead breaking unit that improves the effectiveness of the bead breaking operation of the tires by implementing an apparatus that can adapt to almost the entire range of tires as far as rigidity and size are concerned.

Within the scope of such technical aim, another object of the present invention is to cater for the above aims with a simple structure, of relatively practical implementation, safe to use and with effective operation, as well as having a relatively low cost.

SUMMARY OF THE INVENTION

The above mentioned objects are all achieved by this bead breaking unit for tire changing machines, of the type comprising an arm with a first end jointed to the base of a tire changing machine on a substantially vertical axis and a second end associated to a bead breaking tool, the arm being suitable for oscillating between a home position, wherein the bead breaking tool is placed away from the base, and a working position, wherein the bead breaking tool is placed in contact with a wheel that has to undergo bead breaking resting against at least one side pad protruding at least in part from base, characterised in that it includes an adjustment device for adjusting the slant of the resting surface of the pad suitable for defining at least two working configurations.

Further characteristics and advantages of the present invention will appear even more evident from the detailed description of a preferred, but not exclusive, embodiment of a bead breaking unit for tire changing machines, illustrated indicatively by way of non limiting example, in the attached drawings.

DETAILED DESCRIPTION OF THE PREFERRED EMBODIMENT

Figure 1:
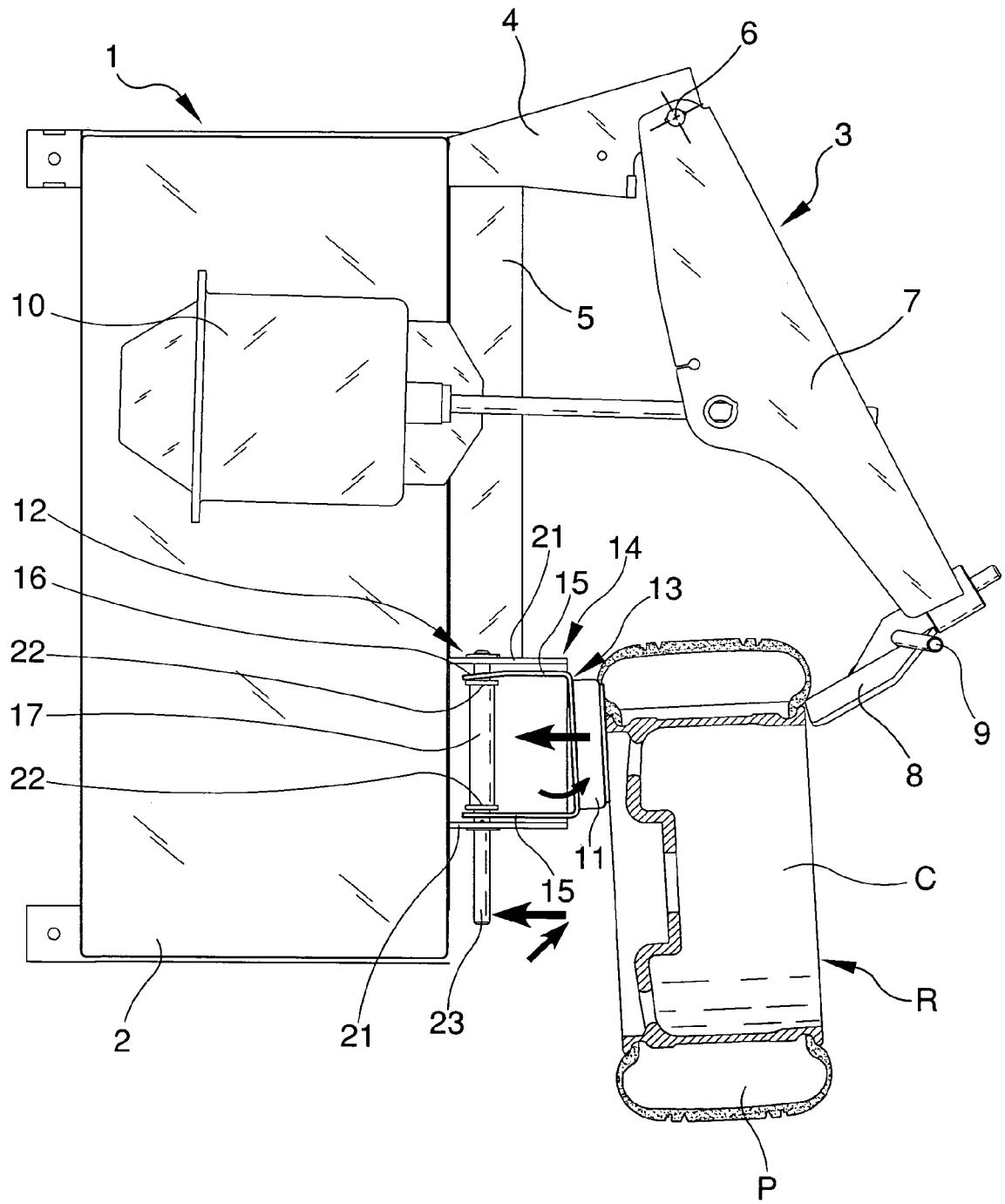
FIG. 1 is a view from the top of a tire changing machine on which the bead breaking unit is mounted, according to the invention, in the working position with the telescopic element closed.

With special reference to such figures, a tire changing machine for fitting and removing a tire P onto and from the rim C of a wheel R, has been globally and schematically designated by reference number 1.

The tire changing machine 1 has a base 2 on which the swivel locking plate and the tool for removing the tire P from the wheel R are housed; the locking plate and the tool for removing are not illustrated in detail in the figures.

On one of the sides of the base 2 is a bead breaking unit 3 having a connecting appendage 4 that is fixed to a rib 5 on the side of the base 2.

The connecting appendage 4 is crossed vertically by a hinging pivot 6 that supports a first end of a swivel arm 7.

The arm 7 has a second end, opposite the first, on which a bead breaking tool 8 is mounted of the known shape, that can be made to turn, with respect to the arm 7, around a horizontal and cross axis to the arm 7 by means of a lever 9.

The rotation of the arm 7 around the hinging pivot 6 occurs due to the action of a pneumatic cylinder 10, fixed at one end to the base 2 and at the other end to the substantially median portion of the arm 7.

In actual facts, the operation of the pneumatic cylinder 10 allows the arm 7 to swing between a home position, wherein the bead breaking tool 8 is placed away from the base 2 so the wheel R can be positioned properly, and a working position wherein it is near the base 2 and in contact with the tire P of the wheel R to execute bead breaking.

During bead breaking the rim C of the wheel R is arranged so it is resting against a side pad 11 whose contact surface is made of a non-slip material and has a high friction coefficient.

Usefully, the bead breaking unit 3 has an adjustment device for adjusting the slant of the resting surface of the pad 11, suitable for defining at least two working configurations.

The adjustment device is composed of a telescopic element 12 with a substantially horizontal sliding axis, which is associated to the side of the base 2 and on the head of which the pad 11 is fixed.

The telescopic element 12, in detail, is composed of a first hollow body 13 that supports the pad 11, and a second hollow body 14 fixed to the base 2 crosswise to the rib 5 and inside of which the first body 13 is housed in a slidable way.

In practice, the sliding of the first body 13 inside the second body 14 is suitable for defining a closed position of the telescopic element 12, wherein the pad 11 is positioned in proximity to the base 2, and an open position wherein the pad 11 is positioned away from the base 2.

The first body 13 has two lateral sides 15 substantially parallel with the sliding direction of the telescopic element 12, one of which is longer than the other allowing to give the pad 11 a slant of about ± three sexagesimal degrees with respect to a vertical plane parallel with the side of the base 2 on which the bead breaking unit 3 is mounted; in addition, the shorter lateral side 15 has, advantageously, a portion of the end 16 folded in towards the inside of the telescopic element 12.

The forward and backward strokes of the pad 11 are entrusted to a kinematic coupling between the bodies 13 and 14, which comprises two rods 17 overlapping parallel with each other and arranged horizontally.

The ends of the rods 17 are individually received, according to a free sliding coupling, in first slots 18 created in the lateral sides 15 of the first body 13 and in second slots 19a, 19b, 20a and 20b created in the lateral sides 21 of the second body 14.

The rods 17 protrude from both the lateral sides 21 of the second body 14, enough to be blocked by a stopping system, of the known type.

In addition, the rods 17 are connected together by means of two small connecting rods 22, vertical and opposite, positioned close to the lateral sides 15 of the first body 13 inside the telescopic element 12.

The first slots 18 created on the first body 13 are rectilinear and aligned according to a vertical direction.

The second slots 19a, 19b, 20a and 20b on the second body 14 start and end in the same point as the first slots 18 and have shapes and slant different from one another.

In detail, the second slots 19a and 19b created on the lateral side 21 of the second body 14 opposite the hinged end of the arm 7 comprise an upper first section that slants downwards and towards the pad 11, and a lower second section that extends from the first section towards the bottom but on the opposite side with respect to the pad 11.

The second slots 20a and 20b which, instead, are on the lateral side 21 facing towards the hinged end of the arm 7, comprise an upper first section that slants downwards and towards the pad 11, and a lower vertical second section.

Advantageously, the pair of second slots 19a and 20a, both reciprocally facing each other and along which the top rod 17 is engaged, have a short initial section, substantially horizontal of a size sufficient to house the above rod in safe conditions, with the purpose of avoiding an uncontrolled disengagement of the rod from its housing during the various bead breaking operations.

The slant of the oblique sections of the second slots 19a, 19b, 20a and 20b can vary in alternative implementations of the invention where one wishes to vary the stroke of the telescopic element 12.

It will be obvious to a technician in the sector that the correspondence, as described here, between the slots 18, 19a, 19b, 20a and 20b and the telescopic element 12 is only an example and not binding; it is, in fact, possible to obtain the same technical results also by creating the vertical slots on the second body 14 and the oblique ones on the first body 13, but in this case the slant must necessarily be contrary to that described.

Figure 2:
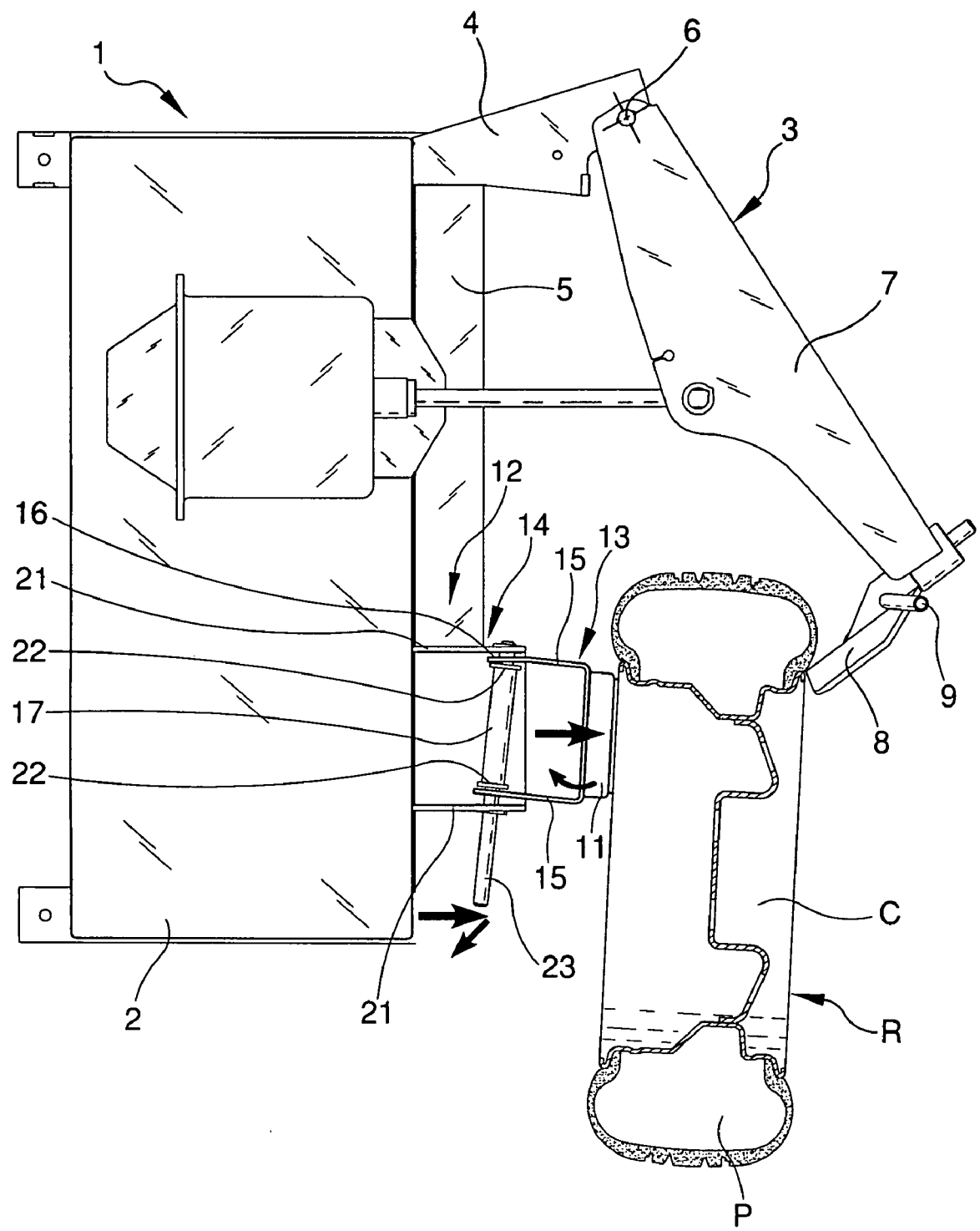
FIG. 2 is a view from the top of a tire changing machine on which the bead breaking unit is mounted, according to the invention, in the working position with the telescopic element open.
Figure 3:
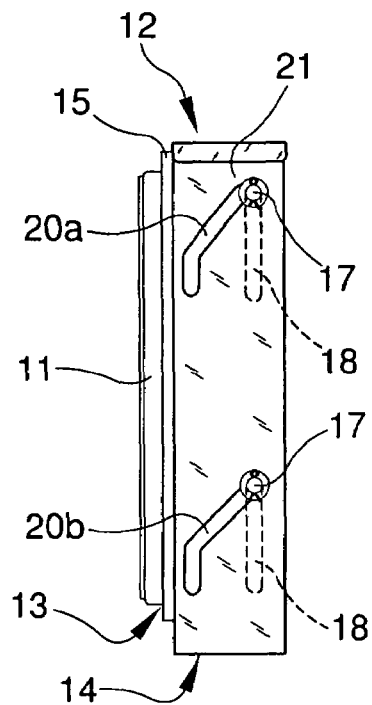
FIGS. 3 and 5 are side and partial views of the telescopic element of the bead breaking unit according to the invention in the closed position.
Figure 4:
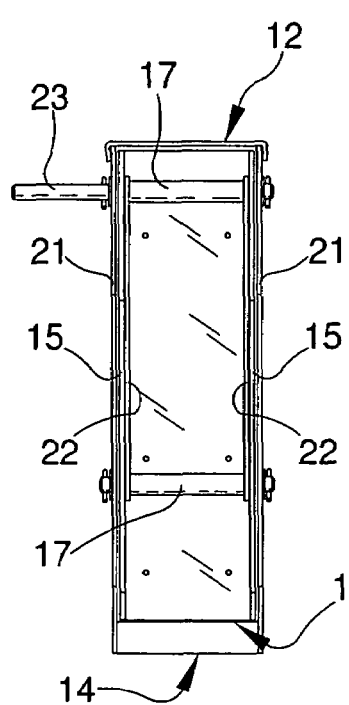
FIG. 4 is a front and partial view of the telescopic element of the bead breaking unit according to the invention in the closed position.
Figure 5:
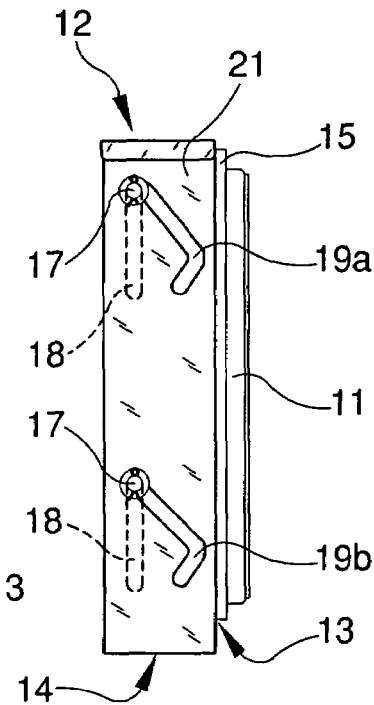
Figure 6:
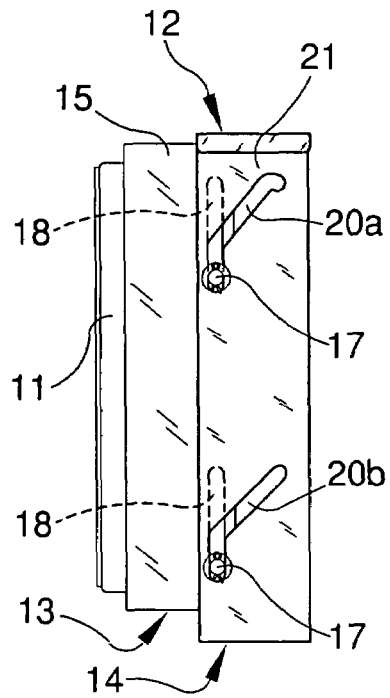
FIGS. 6 and 8 are side and partial views of the telescopic element of the bead breaking unit according to the invention in the open position.
Figure 7:
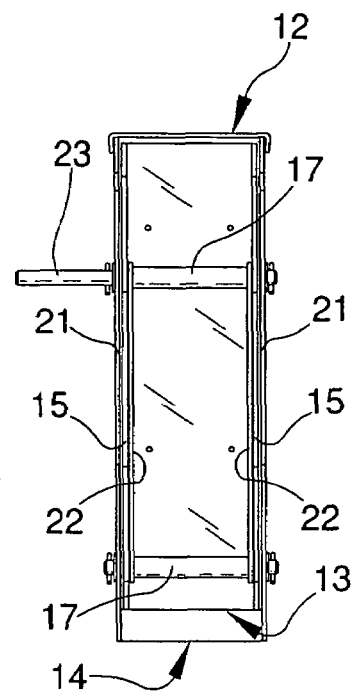
FIG. 7 is a front and partial view of the telescopic element of the bead breaking unit according to the invention in the open position.
Figure 8:
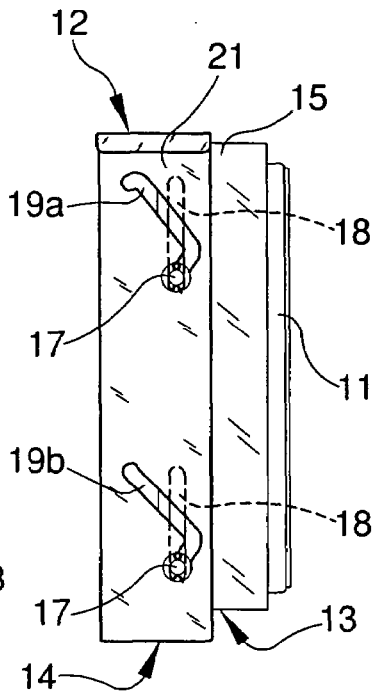

Conforming to the invention, the pad 11 can engage two different working configurations, illustrated clearly in the FIGS. 1 and 2 respectively, the positions of which ensure an excellent bead breaking of any type of tire.

The forward/backward strokes of the pad 11 are entrusted to the lifting/lowering of the rods 17, action which can be done using an operating device of the manual type constituted, for example, by a handle 23 fastened integral with one of the ends of the rods 17, or using an operating device constituted by a linear actuator positioned inside the bodies 13 and 14, with one end fastened to the base 2 and the other to one of the rods 17.

The particular conformation of the invention, in particular as regards to the asymmetry of the second slots 19a, 19b, 20a and 20b that cause the rods 17 to block on unaligned points with a horizontal axis parallel with the rib 5 when the telescopic element 12 is in the open position, and the folding of the end portion 16 of the first body 13, lets the pad 11 not only slide with a forward and backward motion but also, and above all, to be able to vary the angle of the resting surface with respect to a vertical axis.

The pad 11, in fact, can go from an initial working configuration in which the telescopic element 12 is closed and its resting surface is slanted due to the different length of the lateral sides 15 of the first body 13, to a final working configuration in which the telescopic element 12 is open and the resting surface of the pad 11 finds itself turned around a vertical axis with respect to the initial working configuration.

This variation in the slant of the resting surface, together with a translation of the pad 11, determines an effect that leads to a notable change in the angle of incidence of the bead breaking tool 8 on the tire P in the passage between the two operating configurations.

This allows a correct approach both on hard and soft tires and, in general, on all types of tire.

It has in practice been found how the described invention achieves the intended objects.

In particular, it must be pointed out the considerable adaptability capacity of the bead breaking unit according to the invention, making it possible to adjust the relative position between the wheel and the bead breaking tool and to work in optimum conditions on any type of tire.

The invention thus conceived is susceptible of numerous modifications and variations, all of which falling within the scope of the inventive concept.

Furthermore, all the details may be replaced by other elements which are technically equivalent.

In practice, the contingent shapes and dimensions may be any according to requirements without because of this moving outside the protection scope of the following claims.

The invention claimed is:

1. A bead breaking apparatus for use with a tire changing machine which includes a base, an arm having a first end pivotally connected to the base so as to rotate around a vertical axis, and a bead breaking tool mounted on a second end thereof, the arm being rotatable to move the bead breaking tool between a home position remote from the base and a working position near the base, the bead breaking apparatus comprising:
   a pad against which a wheel having a tire mounted on a rim can be positioned for breaking a bead between the tire and rim when the bead breaking tool is in its working position, and
   an adjustable supporting device for mounting the pad on the base, said adjustable supporting device comprising:
      a first body which mounts said pad and which provides first lateral slots,
      a second body which is attachable to the base and which provides second lateral slots,
      a first substantially horizontal rod which has a first end that extends through respective first and second slots of said first and second bodies to enable the first body to be reciprocatingly and kinematically, slidable relative to the second body and enable substantially horizontal telescopic movement of the first body from a closed position near the base to an open position remote from the base, and
      an operating device for moving said first body to a plurality of working configurations relative to the base.

2. The bead breaking apparatus according to claim 1, wherein said first body includes first and second lateral sides, each of which includes said first slots.

3. The bead breaking apparatus according to claim 2, wherein said second body includes third and fourth lateral sides, each of which includes said second slots.

4. The bead breaking apparatus according to claim 3, wherein said first end of said rod extends through first and third slots of said first and third lateral sides, and a second end of said rod extend through first and third slots of said second and fourth lateral sides.

5. The bead breaking apparatus according to claim 4, including a second substantially horizontal rod which has a first end that extends through first and third slots of said first and third lateral sides and a second end which extends through first and third slots of said second and further lateral sides.

6. The bead breaking apparatus according to claim 5, including first and second brackets connecting said first and second rods.

7. The bead breaking unit according to claim 5, wherein said operating device is manually operable.

8. The bead breaking unit according to claim 7, wherein said manual operating device comprises at least one handle integral with one of said first and second rods and protrudes laterally from said first and second bodies.

9. The bead breaking unit according to claim 5, wherein said operating device comprise a linear actuator.

10. The bead breaking unit according to claim 2, wherein said third and fourth slots are asymmetrically arranged relative to one another.

11. The bead breaking unit according to claim 2, wherein one of the first and second lateral sides of said first body is longer than the other.

12. The bead breaking unit according to claim 1, wherein each of said first slots is substantially vertical.

13. The bead breaking unit according to claim 1, wherein each of said second slots is slanted with respect to said first slots.

14. The bead breaking unit according to claim 1, wherein each of said second slots comprises at least one first section slanted and at least a second section for stopping said first rod in one of said working configurations.

15. The bead breaking unit according to claim 14, wherein said second section is substantially vertical.

16. The bead breaking unit according to claim 14, wherein said second section is substantially slanted.

17. The bead breaking unit according to claim 2, wherein one of the first and second lateral sides of said first body has at least one portion of an end folded inwardly.

18. The bead breaking unit according to claim 1, wherein said pad turns around a vertical axis.

19. The bead breaking unit according to claim 1, wherein in at least one of said working configurations said adjustable supporting device is in closed position and said pad is slanted with respect to the sliding direction of said first body.

20. The bead breaking unit according to claim 1, wherein in at least one of said working configurations said adjustable supporting device is in closed position and said pad is at right angles to the sliding direction of said first body.

21. The bead breaking unit according to claim 1, wherein in at least one of said working configurations said adjustable supporting device is in open position and said pad is slanted with respect to the sliding direction of said first body.

* * * * *